(No Model.)

J. K. PROCTOR.
FRICTION CLUTCH.

No. 294,671. Patented Mar. 4, 1884.

WITNESSES:
David S. Williams
James F. Tobin

INVENTOR:
Josiah K. Proctor
by his Attorneys
Howson & Son

UNITED STATES PATENT OFFICE.

JOSIAH K. PROCTOR, OF PHILADELPHIA, PENNSYLVANIA, ASSIGNOR TO THE JAMES SMITH WOOLEN MACHINERY COMPANY, OF SAME PLACE.

FRICTION-CLUTCH.

SPECIFICATION forming part of Letters Patent No. 294,671, dated March 4, 1884.

Application filed October 4, 1883. (No model.)

*To all whom it may concern:*

Be it known that I, JOSIAH K. PROCTOR, a citizen of the United States, and a resident of Philadelphia, Pennsylvania, have invented certain Improvements in Friction-Clutches, of which the following is a specification.

One object of my invention is to so construct the clamping devices of a friction-clutch or coupling that a uniform and forcible grip will be insured without any tendency to distort or unduly strain the two shafts, a further object being to construct the shafts and their bearings in such a manner that they will aid in maintaining the two parts of the clutch properly in line with each other.

Figure 1:
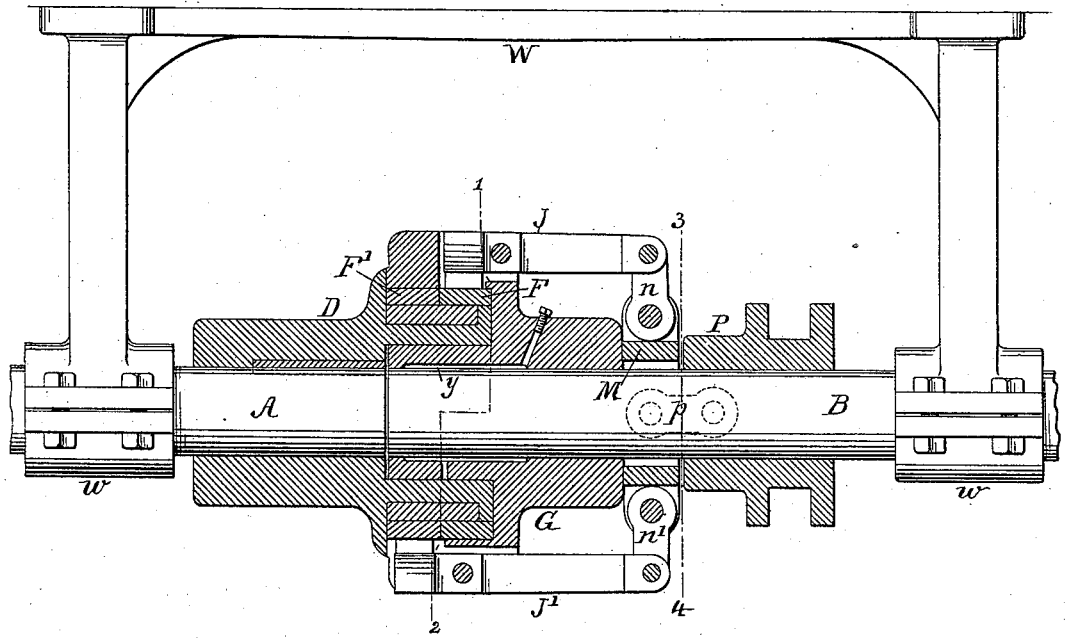
Figure 3:
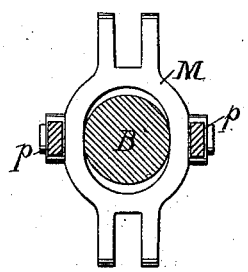
Figure 2:
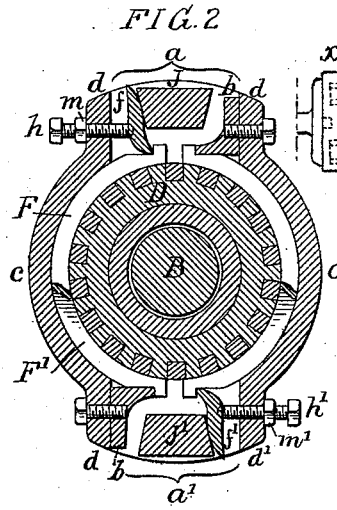

In the accompanying drawings, Figure 1 is a longitudinal section of a friction-clutch coupling with my improvements; Fig. 2, a transverse section on the line 1 2; Fig. 3, a transverse section on the line 3 4; and Fig. 4, a diagram on a reduced scale, showing one of the features of my invention.

A represents part of a shaft to which power is applied in any suitable manner, and B part of a shaft which has to be clutched to or released from the shaft A.

To the shaft A is secured a hub, D, a portion of which is embraced by two split rings, F F', placed side by side, and contained within a flanged disk, G, secured to the shaft B. The flange c of the disk has opposite openings, a a', formed therein, the ends of the split ring F being within the opening a, and the ends of the split ring F' within the opening a', as shown in Fig. 2. One end of the ring F bears against a stud, b, secured to a rib, d, on the flange c, the opposite end of the ring engaging with one arm of a lever, f, which is hung to a screw-stud, h, adapted to a threaded opening in the opposite rib, d, of the flange, so as to be adjustable therein, the stud being secured in position after adjustment by a jam-nut, m. The opposite arm of the lever f is acted upon by the wedge-like short arm of a lever, J, hung to the ribs d, the long arm of this lever being connected by a link, n, to a sleeve, M, which is hung by links p to a collar, P, free to slide on the shaft B, and grooved for the reception of the usual clutch-operating arm or lever. Precisely similar devices on the opposite side of the disk G are used in connection with the ring F', these devices comprising the stud b', ribs d', lever f', screw-stud h', jam-nut m', lever J', and link n', so that when the collar P and sleeve M are moved longitudinally toward the disk G the short arms of the levers J J' will be depressed, and will actuate the levers f f', thereby tightening the rings F F' to the hub D, and thus clutching the two shafts A and B together, the rings expanding and releasing the hub when the short arms of the levers J J' are retracted on withdrawing the sleeve.

In clutches of this class it has been usual to employ but one friction-ring for bearing on the hub. When the ring is clutched to the hub, there is a lateral thrust imparted to the latter, and, in the absence of means for keeping the said hub perfectly true and concentric with the ring, there is a deflection of the shaft which carries the hub until the ring strikes the surrounding flange or casing and checks the movement. By using two rings set opposite each other, as described, I overcome this objection, as the tendency of one ring to force the hub in one direction is counteracted by the tendency of the other ring to force the said hub in the opposite direction. If a sleeve, M, guided rigidly on the shaft, is used to operate the levers J J', however, there will, in the event of an unequal adjustment of the fulcrums of the levers f f' or unevenness in size or wear of the parts, be a tendency of one ring to clamp the hub sooner or more forcibly than the other, and thus in a measure defeat the object of using the two rings; hence I make the opening in the sleeve M larger than the shaft, so that said sleeve is free to move transversely to the shaft, and thus accommodate itself to any inequality or unevenness in the parts of the clutch.

It has been usual, also, in hub friction-clutches to draw together the opposite ends of the clamping-ring by using a pair of levers similar to the levers f f', one lever acting on one end of the ring and the other on the opposite end. A consequence of this is that in starting the clutch a severe strain is put upon the lever which engages the front end of the ring, the power to start the clutch being transmitted through this lever and the set-screw forming the fulcrum of the same. In my present clutch I use a fixed stud, b, in place of a lever, and thus have a rigid connection between the flanged hub G and the front end of the clamping-ring, the lever $f$ or $f'$ simply following the ring and serving to keep it tight to the hub, as will be understood on reference to Fig. 2, in which the shaft A is supposed to be turning in the direction of the arrow.

Figure 4:
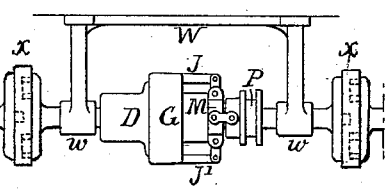

It will be observed on reference to Fig. 4 that the shafts A and B are adapted to bearings $w$ $w$ in a hanger, W, and that each shaft outside of the bearing $w$ is furnished with a yielding coupling, $x$, those shown in the drawings being similar to that for which J. K. Proctor and I. W. Huckins filed application for United States Patent on the 3d day of December, 1883, Serial No. 113,365. Other forms of coupling which will permit a transverse yield of one shaft in respect to the other may, however, be used. By this means the portions of the shafts immediately at and near the clutch are held rigidly in line with each other, and are not affected by deflection or distortion of the other portions of said shafts. The bearings $w$ preferably form part of a single hanger, although independent hangers may be used, if desired, and in some cases it may be found sufficient to use a coupling, $x$, on the shaft B only, the shaft A being continuous.

The hub of the disk G in the present instance extends into the end of the hub D, and forms a bearing therefor, and in the disk G is an oil-chamber, $y$, communicating through a suitable opening or openings with this bearing for the purpose of lubricating the same. This, however, I do not claim, as it forms part of a separate application filed by me on the 20th day of August, 1883, Serial No. 104,171.

The transversely-yielding sleeve M may be used for operating the levers of a clutch such as described in said application; or the features of my present invention may be applied to couplings in which the clamping-sleeves bind either externally or internally upon a rim or flange instead of a hub; and the invention may be applied to clutch-pulleys as well as to shaft-couplings.

I claim as my invention—

1. The combination of a shaft, wheel, or pulley having a hub or flange, two split clamping-rings adapted to said hub or flange and set opposite each other, a pair of levers whereby the rings may be clamped to the hub or flange, and a transversely-yielding sleeve for applying power to said levers, as set forth.

2. The combination of a series of operating-levers of a friction-clutch with a longitudinally-moving sleeve for operating said levers, the opening in said sleeve being larger than the shaft on which it slides, whereby a transverse yield of the sleeve is permitted, as set forth.

3. The combination of a shaft, wheel, or pulley having a hub or flange, a clutching-ring adapted thereto, a disk or driver, G, a fixed stud forming a connection between the disk and the front end of the ring, and a lever hung to the disk and bearing on the opposite end of the ring, as set forth.

4. The combination of the two shafts A and B and friction-clutch mechanism for connecting the same, with bearings $w$ for said shafts, one or both of the latter having outside its bearing a yielding coupling, $x$, as set forth.

5. The combination of the shafts A B and the friction-clutch mechanism for connecting the same, the coupling or couplings $x$, and the single hanger W, having a bearing, $w$, for each shaft, as set forth.

In testimony whereof I have signed my name to this specification in the presence of two subscribing witnesses.

JOSIAH K. PROCTOR.

Witnesses:
JOHN E. PARKER,
HARRY SMITH.